Patented July 6, 1937

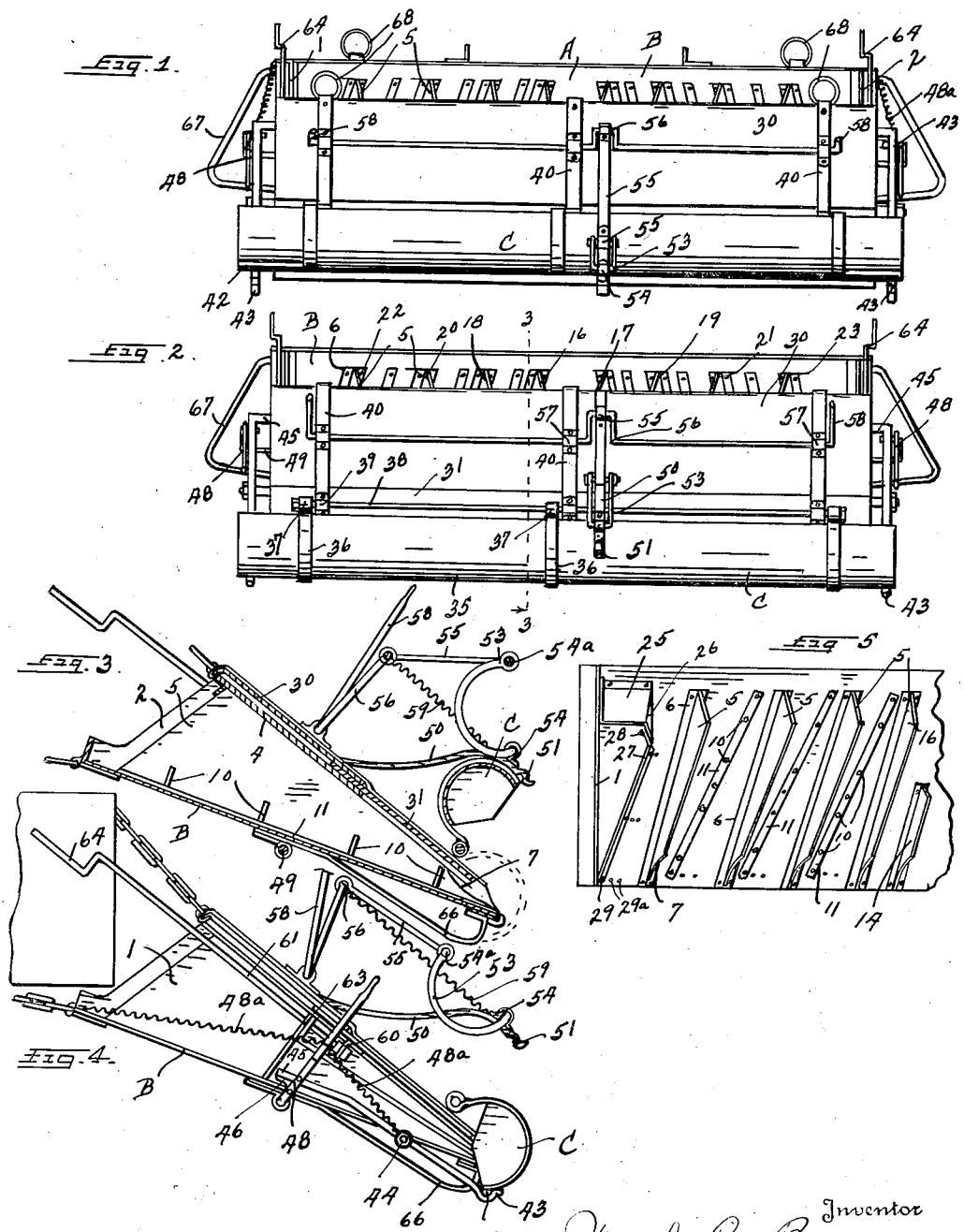

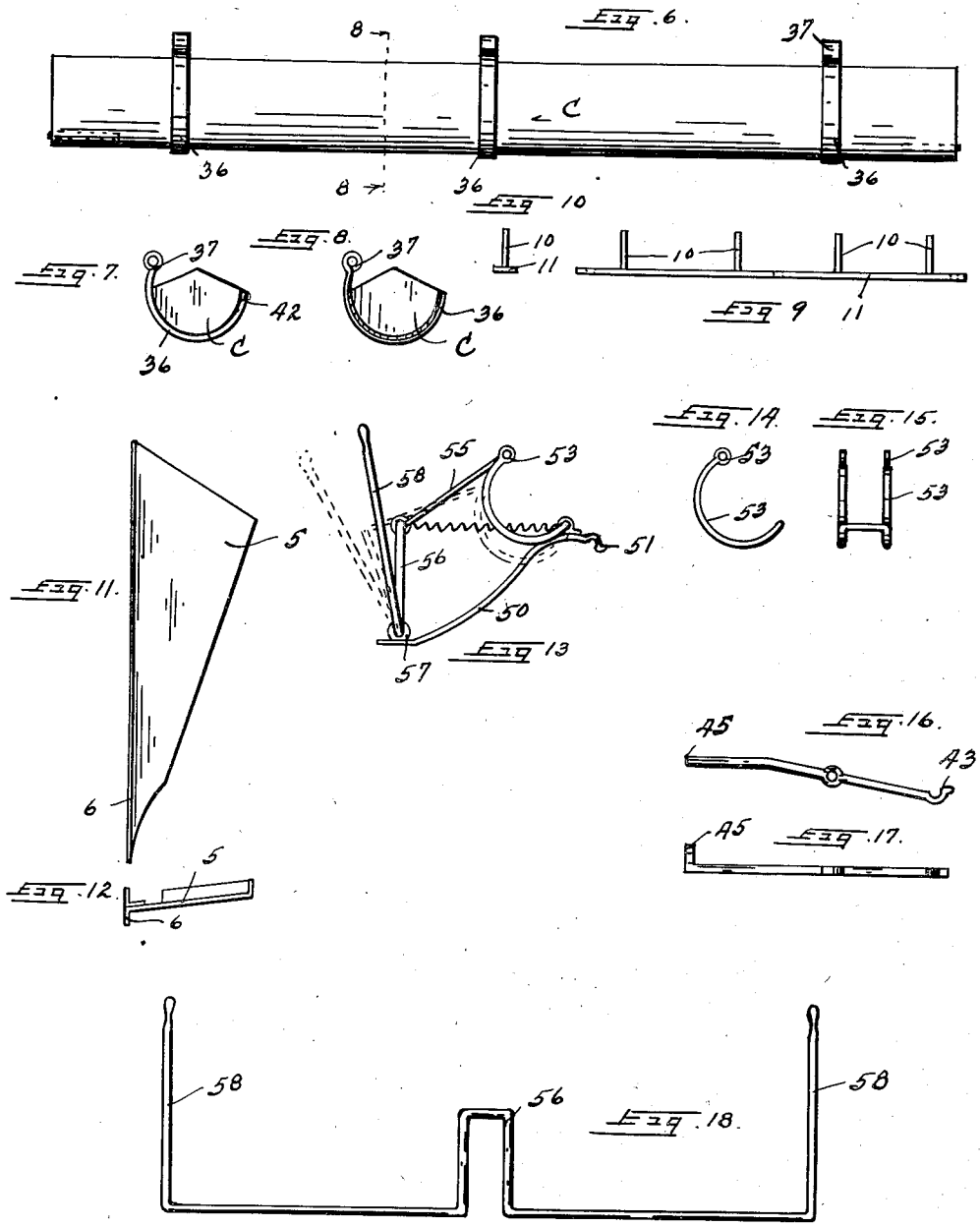

2,085,895

UNITED STATES PATENT OFFICE 2,085,895

GRAVITY SAND AND GRAVEL SPREADER

Woody E. Broome, Myton, Utah, assignor of one-third to Richard S. Broome and one-third to Emma M. Jakeman Application August 16, 1935, Serial No. 36,539

3 Claims. (Cl. 275—14)

My invention relates to gravel spreaders and has for its object to provide a new and efficient gravel spreader which will be easily operated, efficient in operation, and quickly controlled and which may be used on successive trucks as they arrive on the strip of road being covered.

A further object is to provide a gravel spreader which will spread a thin layer of gravel over the surface of the road, spreading the gravel wider than the width of the truck when desired.

A still further object is to provide a highly efficient gravel spreader which will spread gravel over the surface to be covered in an even layer with no space receiving more or less than any other space and with no extra men needed for handling the spreader at the same time eliminating the men usually used for spreading and covering the road after the trucks have dumped their load.

This spreader then accomplishes a great saving to the contractor for he may cover a longer stretch of road with less expense and more efficiently and at the same time will aid cities and States, giving a greater spread to the money appropriated for such work by making this money go farther and accomplish greater results and at the same time enabling more men to go to work on these larger projects.

These and many other objects are accomplished with the device illustrated in the accompanying drawings in which similar numerals and letters of reference indicate like parts throughout the several views and as described in the specification forming a part of this application and pointed out in the appended claims.

In the drawings in which I have shown my device

Figure 1 is a face view of the gravel spreader with the closure trap shown in the open position.

Figure 2 is a face view of the same with the trap closed.

Figure 3 is a section on line 3—3 of Figure 2 showing the closure trap locked open.

Figure 4 is an end view of the spreader with the closure trap shown in the closed position.

Figure 5 is a view of the back plate of the spreader and the deflecting vanes, and spreader pins.

Figure 6 is a face view of the closure trap.

Figure 7 is an end view of Figure 6.

Figure 8 is a section on line 8—8 of Figure 6.

Figure 9 is a side view of the spreader pins and mounting plate.

Figure 10 is an end view of Figure 9.

Figure 11 is a side view of one of the spreader vanes.

Figure 12 is an end view of Figure 11.

Figure 13 is a diagrammatic view of the trap engaging and releasing device.

Figure 14 is a side view of the U-shaped release for the trap.

Figure 15 is a face view of Figure 14.

Figure 16 is a side view of the locking dog used to lock the trap closed.

Figure 17 is a plan view thereof.

Figure 18 is a face view of the control levers and crank shaft used to control the release for the trap.

This spreader is of the closed type with vanes graduated to distribute gravel from a dump body of a dump truck to distribute gravel beyond the width of the dump truck body to the desired width of spread desired, said gravel to be spread in an even layer of the required thickness on a road bed, or any other surface desired. This device is provided an adjustable control gate to regulate the flow of gravel that may pass through the spreader. This device also has a control trap mounted to the spreader to shut off the flow of material therefrom leaving the remaining gravel in the truck body to be used on another place or stretch of road as desired by the operator. The trap is controlled by levers to release the catches or dogs which hold the trap shut and with hand levers to release the catches or dogs. A spring dog or catch is provided to engage the trap and hold it shut with levers and toggle to release the trap so as to engage the dogs to hold it shut.

The spreader table or plate is provided with diverging vanes and with spreader pins which vanes and pins catch the gravel as it is delivered from the dump truck conveying it beyond the width of the truck body to any desired width and flowing the gravel out onto the surface to be covered in an even surface of equal depth throughout. Also end vanes are provided adjustably mounted in the ends of the spreader to deflect the flow of gravel and narrow the spread where desired. These end vanes or deflector plates are adjustably mounted to allow for different spreads and to regulate the width of the spread and therefore the amount of gravel allowed to pass through the end sections of the spreader.

A suitable wheeled carrier may be provided to transport the spreader and support it when detached from one truck body and waiting for the next loaded truck to arrive to which the spreader is attached to distribute the gravel from this truck.

The spreader consists of a long box-like body A made of a back spreader plate B to which triangular shaped ends 1 and 2 are secured. Across the ends 1 and 2 and enclosing the upper portion of the spreader I provide a plate 4 which plate is secured in fixed relation to the ends 1 and 2. This plate extends down about half way over the face of the spreader box, and between this plate and the spreader plate I then provide my spaced apart diverging spreader vanes 5 which are formed somewhat triangular in shape similar to the ends 1 and 2. These spreader vanes extend down to the lower edge of the back spreader plate and are secured thereto by flanges 6 formed along the sides thereof. The front edge of the spreader vanes extend down beyond the bottom of the plate 4 and each vane is cut away in a curve at 7 to allow for some of the gravel to spill over this portion of the vane to make the spread complete. The vanes are secured to the back plate in diverging positions with the tops nearer together than the bottom ends and between each plate I provide a row of spreader pins 10, said pins being secured to strips 11 which are in turn secured to the back plate and the strips and pins are secured to the back plate on an angle to the vanes to extend diagonally from the top of one to near the bottom of the next vane and each row of pins helps to spread the gravel in an even layer.

The vanes are mounted with the central ones 14 and 15 shorter than the others and with the next two vanes 16 and 17 full length with the lower ends diverging equidistant from a line drawn medially up the back of the spreader plate. The vanes 18 and 19 are set outside the vanes 16 and 17 spaced therefrom and other vanes 20 and 21, and 22 and 23, are mounted outside these vanes respectively and each is farther from the middle than the last and farther apart than the two preceding. In the space between the last vanes 22 and 23 at each end of the spreader I provide an adjustable gravel control dividing partition, said partition having the top end 25 secured fixed to the back plate to prevent gravel from entering the outer end of the spreader unless desired for a wide spread at which time these partitions are entirely removed. The inner end of this partition is turned down at 26 and under this turned down end I then mount the rest of the partition. This consists of a plate 27 having the top end turned to fit the end 26 of the partition 25. This end is pivotally secured to the back plate B by a pivot bolt 28 and the plate extends down to the bottom of the back plate in a triangular form to entirely close off the space between the end 1 or 2 and the plate. The lower end is adjustably mounted to the back plate by a bolt 29 and adjustment holes 29a are provided in the back plate B to allow the plate 27 to be adjusted to control the width of spread of the device.

Onto the outside of the plate 4, I then mount another plate 30, said plate being spaced from the plate 4 and between these two plates the flow control valve plate 31 is carried. This plate is adapted to be moved up and down between these two plates 4 and 30 and the lower edge of this plate controls the amount of gravel allowed to leave the spreader box A. This last mentioned valve plate 31 forms the rest of the front of the box. The lower end of this plate is set away from the lower end of the back plate sufficient distance to allow the desired amount of gravel to pass down over the back plate B and under the valve plate 31.

As a control means for shutting off the flow of gravel from the spreader box I provide a closure trap C, said trap consisting of a semi-cylindrical body or trough 35 having the ends closed and having strengthening bands 36 formed around said trap with one end of the bands formed into a hinge 37. This hinge 37 is pivotally mounted to the body of the spreader box by pivot rod 38 passing through hinge blocks 39 formed on strengthening members 40 over the face of the box. On each end of the trap on the lower edge thereof I provide a lug 42 adapted to engage in a catch 43 when the trap is in the closed position. The catch 43 is pivotally mounted on shaft 44 at each end of the spreader box A and has the top end provided with a lug 45 which is engaged by a dog 46 said dog 46 being formed as a part of a control lever 48. There are two such levers 48 formed on each end of a cross shaft 49 extending across the length of the back side of the back plate B and each lever or either lever may be used to throw both dogs, they being integral and operative simultaneously. Thus, when it is desired to flow gravel from the spreader either of the levers 48 may be moved forward and down of the spreader box and this will disengage both catches 43 and leave trap hanging freely under the outlet of the spreader. The operator then lifts the trap until it engages a locking spring 50 which is mounted to the spreader medially thereof. Springs 48a are secured to the levers 48 to hold them positioned. The spring 50 is mounted to the face of the outside plate 30 and is formed with a curve and with the dog 51 formed in the end of the spring 50, said dog to engage the edge of the trap medially thereof and hold it in the open position. Thus the trap may be either locked open or closed as desired. An automatic release is provided so that the driver may release the trap and lock the trap shut, which consists of a U-shaped semi-circular pressure release lever 53 mounted onto the top side of the spring 50 by a bearing 54 and with the ends of each leg formed perforated to receive a shaft 53, said shaft carrying a link bar 55 thereon. The other end of this link bar is mounted onto a crank shaft 56 which shaft is mounted to the plate 30 on the front face of the spreader box in bearings 57 mounted onto the reinforcing bands or strengthening members 40 and each end of the shaft is formed into a control lever 58. With this form the crank shaft may be operated from either side of the box or from the driver's compartment by a rope attached to either or both of said levers 58. A spring 59 normally holds the crank shaft in its throw position. When the crank shaft is actuated by either lever, the curve of the U-shaped release lever being moved by the link, will engage the top side of the trap and force it from the spring dog 51 in the end of the spring 50 and the weight of the trap will automatically drop the trap over the outlet end of the gravel spreader and engage the lugs 42 with their respective catches 43 locking the spreader shut.

The control gate or plate 31 is provided with a depending bracket 60 on the back side of each end thereof and this bracket carries the rotative end of an adjusting screw 61 and the screw passes up through a threaded bracket 63 formed in each end of the spreader box and has the top end of the screw formed into a crank handle 64; thus, the screw may be rotated and the plate 31 moved up or down to open or close the size of the open slot in the lower end of the spreader to control the flow of gravel therethrough.

Skid bars 66 are mounted on each end of the lower side of the spreader box under the plate B to prevent the spreader from digging into the earth or catching on the road and breaking. Guard bars 67 are mounted on each end to prevent passing trucks or obstacles from wrecking the spreader.

Suitable support rings 68 are provided on the spreader by which it is supported onto the outlet end of the dump truck bodies.

Each space between the distributing vanes of the spreader is provided with an adjustable pin bar 69 carrying spreader pins 70, said pins aiding in spreading the gravel and the holes 71 are provided to allow for adjustment of the ends of the spreader pin bar.

Medially of the spreader plate B, I also provide short spreader vanes 72 to divide the gravel passing through the central portion of the spreader. These vanes are alike, but shorter than the vanes 5.

The operation of the device is as follows:

The spreader is used on a resurfacing job or similar places where it is desired to spread gravel or sand and one spreader may be used for several trucks or each truck may be equipped with a spreader as desired.

The truck body is elevated to the position to allow the end gate to open and the material rolls down into the spreader box where it is divided by vanes into equal even proportions and the user opening the closure trap C allows this divided material to flow evenly from the rear end of the spreader onto the surface being covered. When the truck is empty the spreader is removed therefrom and attached to a full truck. If it is desired to stop the flow of material at any place, the lever 58 is actuated by hand and this causes the member 53 to strike the trap C causing it to drop with gravity force and close the end of the spreader box shutting off the supply passing therethrough instantly. When it is desired to again spread the gravel, the operator releases either of the levers 48 and this frees the trap which is then manually raised until the edge of it engages the spring catch 50 holding it in the open or operating position.

The flow of gravel over the spreader pins and through the box, being divided by the vanes, provides a smooth even surface with no ridges or unevenness at any point, making a more efficient job of spreading the gravel.

Having thus described my invention, I desire to secure by Letters Patent and claim:

1. In a gravel spreader, the combination of a spreader box to be suspended from the rear end of a gravel truck body; a closure plate slidably mounted at the face of said box to adjust the amount of flow from said box; means to raise and lower said plate by screws; a closure trap to close off the bottom of said spreader box consisting of a semi-cylindrical trough pivotally mounted to said spreader box; means to hold said trap open, and means to hold said trap closed.

2. In a gravel spreader, the combination of a spreader box to be suspended from the rear end of a gravel truck; a closure plate mounted to adjust the amount of flow from said box when the truck body has been tilted to direct the flow of material thereinto; a closure trap to close off the bottom of said spreader box consisting of a semi-circular trough pivotally mounted along the back side of the box said trap to be raised along the back side of the spreader box when open; means by a pressure release lever to drop the trap by gravity force over the outlet of the spreader box; means to lock the box in open position by a spring lock; and means to lock the trap closed by spring controlled catches at each end thereof.

3. In a gravel spreader, the combination of a spreader box to be suspended from the rear end of a gravel truck; a closure plate mounted to adjust the flow of gravel from said box; a closure trap to close off the bottom of said spreader said trap consisting of a semi-circular trough pivotally mounted along the back side of said box, said trap to be raised along the back side of said spreader box when opened; a locking spring to engage the edge of said trap and hold it locked in open position; spring controlled catches at each end of said trap to lock the trap in closed position and means by a pressure release lever to release the locking spring when the trap is in open position to drop the trap over the outlet of the spreader box and shut off the flow therefrom.

WOODY E. BROOME.